Jan. 15, 1963  A. A. HURT  3,073,606
METHOD OF MIXING AND SPREADING FERTILIZER
Filed June 20, 1960  2 Sheets-Sheet 2
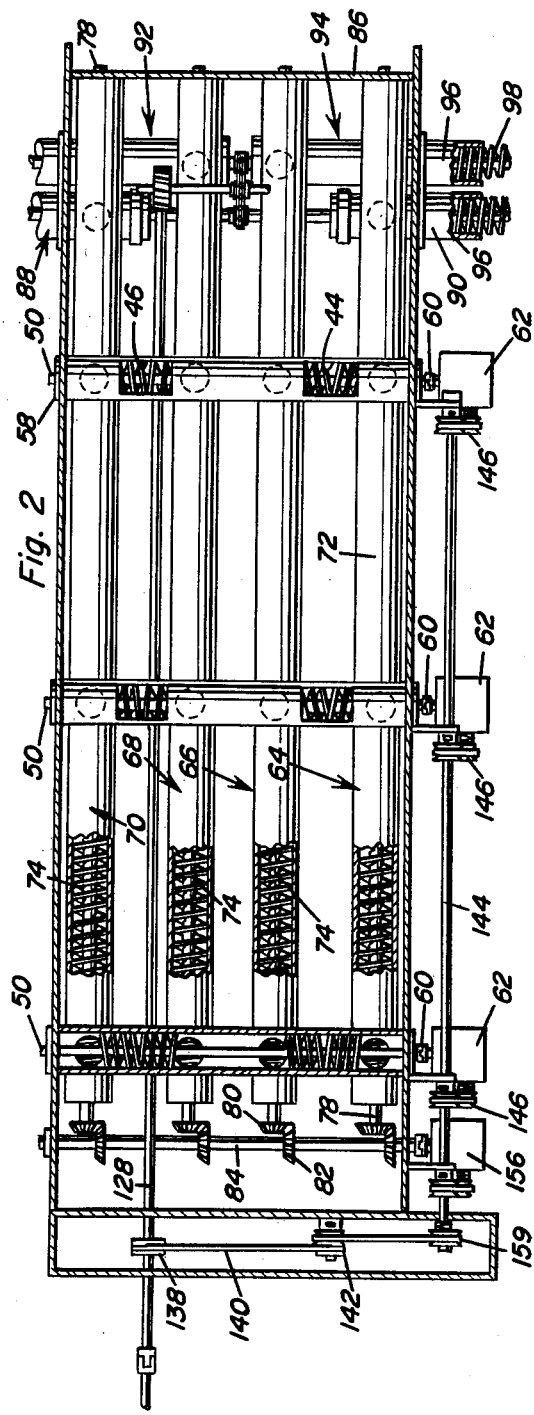
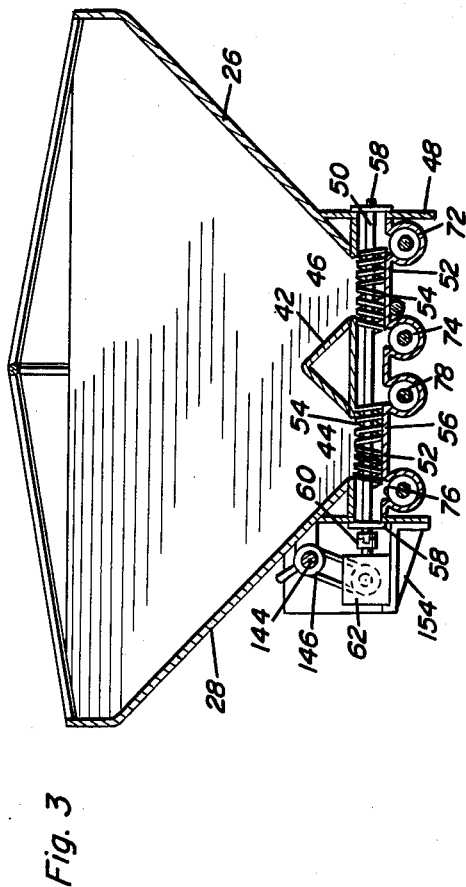
Arthur A. Hurt
INVENTOR.

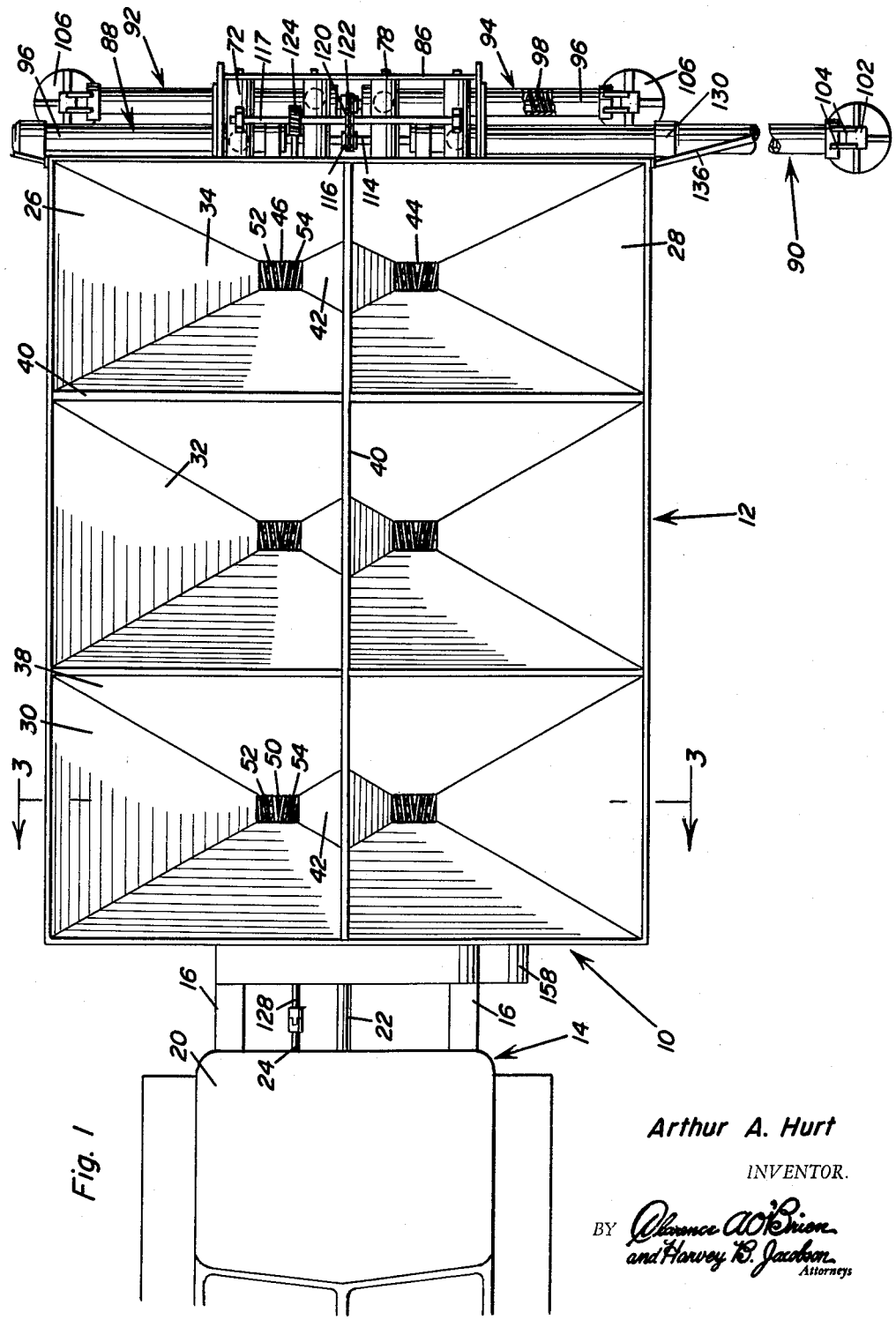

United States Patent Office 3,073,606
Patented Jan. 15, 1963

3,073,606
METHOD OF MIXING AND SPREADING
FERTILIZER
Arthur A. Hurt, 1608 4th Ave. E., Spencer, Iowa
Filed June 20, 1960, Ser. No. 37,148
6 Claims. (Cl. 275—8)

The present invention generally relates to a method for mixing fertilizer and spreading the mixed fertilizer and this application is a continuation-in-part of Serial No. 621,042 for Fertilizer Mixing and Spreading Machine, filed November 8, 1956, now patent No. 2,947,544.

Heretofore, the ingredients of fertilizer, usually phosphate, nitrogen and potash, have been brought together in a mixing facility located remote from the field in which the fertilizer is to be spread. Such mixing is normally done at a feed mill or fertilizer plant where the mixed fertilizer is then sacked or bagged and shipped in paper sacks or burlap bags to the ultimate consumer. This enables the ultimate consumer to spread the mixed fertilizer on the soil with any suitable spreader. However, the farmer or ultimate consumer must then pay for such mixing and bagging as well as transportation costs thus rendering the fertilizer too expensive for use in certain instances and also reducing the margin of profit of the farmer inasmuch as the expense of the particular crop is increased. In the present invention, the inventive concept lies in the provision of the fertilizer ingredients in bulk form with the ultimate consumer purchasing the same and transporting the same to the point of actual use. The ingredients are then simultaneously mixed in the proper proportion for giving the desired fertilizer analysis and then spread onto the field at the desired quantity per given area.

In carrying out the method of the present invention, the ingredients are provided in a portable compartmented storage bin with a controlled positive discharge arrangement whereby the quantity of each ingredient may be accurately and positively controlled with the measured ingredients being discharged into a plurality of screw auger conveyors whereby the ingredients are thoroughly mixed during the conveying thereof after which the mixed ingredients are discharged over a certain area with each of the screw auger conveyors supplying a particular area of the land surface to be covered.

An object of the present invention is to provide a fertilizer mixing and spreading method carried out by a machine incorporating a bin for each fertilizer ingredient having discharge augers in each bin for supplying four longitudinal screw auger conveyors from each bin for thoroughly mixing the ingredients during the longitudinal movement thereof together with four laterally extending screw auger conveyors each of which terminates in a rotary turntable having upstanding vanes thereon for broadcasting the mixed ingredients over a circular area having a predetermined radius whereby movement of the bins with a vehicle upon which they may be conveniently mounted will cause the entire area of a field to be properly covered with a predetermined quantity per unit area and with a fertilizer of predetermined analysis.

The major difference of the above method from conventional methods is that in previous and conventional methods, the materials were first weighed, usually in large quantities, and dumped into a common hopper after which they were agitated until they were satisfactorily blended. In distinction to this, the present method involves the weighing of materials into separate hoppers where they are simultaneously metered out in relatively small quantities into conveyors where they are intimately mixed thus resulting in a much more thorough blending operation with the blending or mixing operation requiring only a fraction of the horsepower required by conventional methods since conventional methods require the agitation of relatively large quantities of ingredients while the present invention requires the operation of only the metering augers and the discharge augers.

Also, of major importance in the present invention is the concept of mixing the ingredients throughout their length of transportation from the bins to their discharge point whether it be to a rotary spreading device or into some other spreader, receptacle, sacks, bags or the like.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a plan view of the apparatus in which the method of the present invention may be carried out;

FIGURE 2 is a plan view of the apparatus with the storage bins removed illustrating the metering augers and the longitudinal conveying and mixing augers; and FIGURE 3 is a transverse, sectional view taken substantially upon a plane passing along section line 3—3 of FIGURE 1 illustrating further details of the metering augers.

In the method of mixing and spreading fertilizer, the ingredients of the fertilizer, namely, phosphate, nitrogen and potash are provided in bulk form thus enabling such material to be shipped in bulk form thereby reducing the effective freight rates of the fertilizer. The ingredients of the fertilizer are transported to the acual field upon which the fertilizer is to be spread. The ultimate consumer in this instance the farmer, will have decided upon the particular analysis of fertilizer which he desires for the particular area. By varying the discharge rate of each ingredient for varying the relative quantities of such ingredients, the fertilizer analysis may be readily determined and this analysis will be maintained since the proportionate discharge of the ingredients will remain the same until the proportions are altered by altering the rate of discharge of each ingredient.

One apparatus for carrying out this method is described hereinafter and generally includes a multiplicity of bins which are separated from each other for carrying the ingredients with a metering screw auger conveyor in the bottom of each bin with means for controlling the relative speeds of the screw auger conveyors thus providing a positive discharge rate for each ingredient. The discharge of each of the ingredients is equally divided by four longitudinally extending screw auger conveyors with the ingredients being successively and continuously discharged therein at longitudinally spaced points whereby movement of the ingredients longitudinally in the longitudinal conveyors causes thorough mixing thereof for providing a homogeneous fertilizer mixture for discharge onto the soil. Each of the longtiudinal screw auger conveyors discharge into a transverse screw auger conveyor at the rear of the vehicle upon which the device may be conveniently mounted and is transversely conveyed to a point of discharge and spreading whereby the mixed fertilizer is broadcast or spread by the use of a rotating fan which rotates at a predetermined speed for discharging the fertilizer in a circle of a predetermined radius whereby forward movement of the vehicle will thoroughly and evenly cover the surface area desired. The forward movement of the vehicle may be controlled and by varying the speed of the vehicle which also will normally vary the speed of discharge of the ingredients, the same proportion or quantity of fertilizer will be discharged per unit area regardless of the speed of the vehicle as long as the increased speed of the vehicle increases the speed of discharge of the ingredients.

In understanding the method, reference is made specifically to the drawings in which the numeral 10 generally designates a fertilizer mixing and spreading machine that may be employed in carrying out the method of the present invention. The machine incorporates a generally elongated body designated by the numeral 12 mounted upon a suitable truck generally designated by the numeral 14 which includes frame rails 16, rear driving wheels 18, a cab 20, a drive shaft 22 and a power takeoff shaft 24 all of which represents conventional truck construction with the exception of the load carrying body 12 which is described hereinafter.

The vehicle body 12 includes upwardly and outwardly diverging side walls 26 and 28 which are divided into three compartments designated by numerals 30, 32 and 34 by inclined partition walls 38 with the facing partition walls of each compartment converging downwardly which in conjunction with the side walls 26 and 28 form substantially an inverted pyramidal form generally in the form of a hopper having downwardly converging peripheral walls. The upper edges of the walls 26 and 28 as well as the partition walls 38 are interconnected and braced by tie rods 40 thus rigidifying the entire body 12. Centrally disposed in each compartment 30, 32 and 34 is a triangular hollow housing 42 which separates the compartments into two discharge areas 44 and 46 of equal dimension on each side of the housing 42 inasmuch as the housing 42 extends between and is integral with the compartment walls or partitions 38. The lower ends of the side walls 26 and 28 may be provided with depending plate members 48 supported from the frame rails 16 of the truck 14 in any suitable manner. The details of the supporting mechanism is not shown inasmuch as any suitable bolts or any other fastening arrangement may be employed.

As clearly shown in FIGURES 2 and 3, each compartment is provided with a transverse conveyor shaft 50 underlying the discharge openings 44 and 46. The conveyor shaft 50 is provided with two auger conveyor sections each of which includes a right hand threaded portion 52 and a left hand threaded portion 54. The outer ends of the portions 52 and 54 are received in a generally cylindrical housing portion 56 underlying the openings 44 and 46 and in communication therewith across the top thereof. This arrangement permits an equal amount of ingredient in each of the compartments to be discharged in either direction from each discharge opening 44 and 46. More specifically, an equal amount of ingredient will be discharged from each discharge opening 44 and 46 and an equal amount of such ingredient will move inwardly toward the center of the body 12 as well as outwardly towards the outer end thereof and will be contained within the conveyor housing 56. The screw auger defined by the portions 52 and 54 provides a positive rate of discharge dependent directly upon the rotational speed of the shaft 50. The shaft 50 is journaled in bearings 58 at each end of the tubular housing 56 thus preventing the escape of any of the ingredients discharged from the compartments. The shaft 50 is provided with a coupling 60 on one free end thereof with the coupling 60 connecting the shaft 50 to a gear box 62 whereby the speed of the shaft 50 may be varied for varying the rate of discharge of the ingredients. FIGURE 2 illustrates the top construction of the housing 56 for indicating the inlet openings 44 and 46 and the front transverse conveyor illustrated in FIGURE 2 illustrates the top portion of the housing 56 broken away illustrating the construction of the conveyor portions 52 and 54.

Underlying and extending longitudinally of the body 12 are four longitudinal conveyors generally designated by the numerals 64, 66, 68 and 70 each of which includes an elongated tubular housing 72 with a screw auger 74 disposed therein. Each of the housings 72 is integral with and in communication with each of the transverse housings 56 as provided by communicating areas 76 being disposed immediately at the discharge end of the transverse conveyor sections 52 and 54 as illustrated in FIGURES 2 and 3. Each of the longitudinal conveyors 64, 66, 68 and 70 extends under each of the transverse conveyors for receiving an equal amount of ingredient from each conveyor section 52 and 54. Thus, each of the longitudinal conveyors carries an equal amount of each ingredient wherein the ingredients will be thoroughly mixed in the longitudinal conveyance thereof from the front of the body 12 to the rear thereof. Each of the conveyor screw augers 74 includes a forwardly extending shaft 78 having a bevel gear 80 thereon for meshing engagement with a bevel gear 82 mounted on a transverse shaft 84 for simultaneously driving all of the longitudinal screw auger conveyors at the same rate of speed and in the same rotational direction thus moving the ingredients rearwardly at exactly the same speed with the same quantity of each ingredient disposed in each longitudinal screw auger with the proportion of the ingredients to each other being controlled by the independently controlled speed of the transverse conveyor shaft 50. The rear ends of the conveyor shafts 78 are journaled in a transverse plate 86 extending between the rear ends of the depending plates 48 of the body 12 thus providing bearing support for the longitudinal screw augers 74.

Referring now specifically to FIGURE 1 of the drawings, it is noted that the longitudinal conveyors 64, 66, 68 and 70 terminate rearwardly of the body 12 and terminate in overlying relation to a pair of outwardly extending elongated conveyors generally designated by the numerals 88 and 90 and also overlie a pair of outwardly extending conveyors generally designated by the numerals 92 and 94. Each of the conveyors 88, 90, 92 and 94 includes a tubular housing 96 having a screw auger 98 disposed therein. At the outer end of each of the tubular housings 96, the screw auger shaft is provided with an extension which extends into a gear box 102 supported by brackets 104 on the free end of the tubular housing 96 for altering the direction of the rotational power of the auger shaft to a vertical direction. The gear box 102 is provided with a vertical output shaft having a circular plate 106 mounted thereon. A plurality of upstanding radial members 108 is mounted on the upper surface of the plate 106 thus providing a discharge fan for discharging material in substantially a circular path. Each of the upstanding radial projections is in the form of an L-shaped member and a spout or chute is provided on the outer end of the tubular housing 96 for directing the mixed fertilizer ingredients at the center of the plate 106 whereby an equal amount of ingredients will be discharged to all portions of the plate 106 for evenly spreading the material over the area traversed by the discharge fans or plates 106.

The two outer longitudinal conveyors 64 and 70 are communicated with the elongated transverse conveyors 88 and 90 through passageways in the form of depending tubular housings integral with the tubular housings 72 and 96 respectively. The screw auger conveyors 98 in each instance are provided with an interconnecting shaft 114 each of which is provided with a sprocket gear 116 thereon. Mounted above the longitudinal conveyors 64—70 inclusive is a transverse lay shaft 117 mounted on suitable bearing brackets with the lay shaft 117 having a sprocket gear 120 thereon in alignment with the sprocket gears 116. A sprocket chain 122 encircles the gears 116 and 120 respectively for rotating the shafts 114. A spiral driven gear 124 is provided on the lay shaft 117 for engagement with a spiral drive gear underlying the same and connected to an elongated drive shaft 128 which is operatively connected to the power take-off 24 at the front of the body 12.

As illustrated, the tubular housing 96 of the elongated transverse conveyors 88 and 90 is provided with a telescopic detachable connection 130 to permit the outer section thereof to be removed. Also, a collar 132 is provided on the outer section with the collar having an eye for engagement with the brace 136 which may be in the form of a flexible rod or chain for supporting the outer portion of the elongated transverse conveyors 88 and 90 and permitting the same to be removed and supported in a transported condition alongside the body 12 on catwalks or other supporting mechanism not specifically shown and described. Inasmuch as the shorter conveyors 92 and 94 terminate adjacent the limits of the confines of the rear driving wheels, the device may be conveniently run upon the highways with only the outer sections of the elongated transverse conveyors 88 and 90 removed.

The elongated drive shaft 128 which drives the transverse conveyors is also provided with a pulley 138 for driving a V-belt 140 which in turn drives a variable speed drive mechanism 142 which drives in turn an elongated drive shaft 144 which drives each of the gear boxes 62 through a variable speed drive 146 for driving the output shaft or coupling 60 at varying speeds. The gear boxes 62 may be of any suitable construction and are supported on suitable brackets 154 connected to the depending side plates 48 by any suitable means. The shaft 144 also drives the transverse shaft 84 through a gear box 156 which may also be of some suitable construction and the entire drive apparatus except for the shaft 144 and the gear boxes 62 is encased in a housing 158 thus eliminating the possibility of unauthorized tampering with the drive mechanism and also eliminating the danger of clothing or other materials such as dirt, dust, and the like coming in contact with the drive mechanism thus reducing the wear thereof.

While a simplified drive mechanism is illustrated it is pointed out that shaft 128 in FIGURE 2 leaves the P.T.O. at about 1250 r.p.m. when the motor is doing 2200 r.p.m. The speed of the shaft is then varied and generally reduced to 300 r.p.m. in a gear box. Since the shaft coming from the P.T.O. is approximately 15 inches beneath the plane of the gear box housing and the bevel gears shown as 80 in FIGURE 2, a V-belt operates from the pulley 138 on shaft 128 and extends upward toward the plane of the gear box 156 to the V.S.D. 142 for driving shaft 144.

The V.S.D. 142 is the same as 146 and consists of a pair of discs corresponding to the sides of a regular pulley but has a manual adjustment which makes possible changing the distance between the discs. As they are drawn closer together the belt (a flat belt) climbs on the pulley. Number 159 is a self compensating pulley, thus as you tighten the discs on 142 they spread apart on 159 which gives a slower speed or vice versa, by this means we get a variation in the speed of shaft 144. Each gear box 62 includes an input shaft having a compensating pulley thereon for engaging a belt encircling the pair of movable discs on the shaft 144. The ratio of the flow of each material to the flow of the other two materials is determined by the setting of the V.S.D.'s 146 for varying the input shaft speed into the gear boxes 62, but the amount per acre depends on the speed of shaft 144.

Also, this machine may be used as a stationary mixing machine by closing the holes in the longitudinal conveyors where the material is dropped into the lateral screws leading out to the fans. The longitudinal conveyors extend beyond the spreading equipment and have each another outlet near the end of the tubes, thus making it possible to drop the mixed material into the hopper of an elevator and permitting mixing for planter and side dressing equipment.

Briefly, the ingredients of the fertilizer such as phosphate, nitrogen and potash are disposed in the compartments 30, 32 and 34. By adjusting the V.S.D.'s 146, the rotational speeds of the transverse discharge conveyors may be controlled thus controlling the discharge of ingredients into each of the longitudinal conveyors 64, 66, 68 and 70. The ingredients move rearwardly in the longitudinal conveyors and each of the longitudinal conveyors 64, 66, 68 and 70 discharges into its respective transverse conveyor for outward movement of the mixed ingredients after which the mixed ingredients are discharged onto the rotatable fan or plate for broadcast spreading of the mixed ingredients. Inasmuch as the broadcast spreaders employ centrifugal force to spread the material, the outer edges of the path of the spread will be thinner than the central part thereof since only the heavier particles will be thrown to the outer edge of the path of spread. Thus, by orientating the spreaders so that the edges of the path of spread overlaps, a more even transverse distribution or thickness of spread will be obtained.

In all of the screw auger conveyors including the metering conveyor and the longitudinal conveyor, the screw auger is disposed with the periphery thereof adjacent the interior of the corresponding tubular housing thereby providing a positive displacement conveyor for the material being conveyed. This positive displacement maintains the previously accurately measured ratio of ingredients during the transportation thereof and also maintains the proper proportion of the ingredients.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A method of simultaneously mixing and spreading fertilizer comprising the steps of providing an independent supply of each of the ingredients of the fertilizer, independently controlling the discharge rate of each ingredient, simultaneously conveying and mixing the ingredients continuously from the point of controlled discharge thereby forming a homogeneous mixture, and discharging the ingredients over a predetermined area thus providing a predetermined analysis of fertilizer with a predetermined quantity thereof being spread upon a unit area.

2. The process of preparing fertilizer comprising the steps of arranging the individual ingredients in alignment, discharging an independently variable metered quantity of each ingredient onto a moving conveyor extending under all of the ingredients thus providing a continuous metered quantity of each ingredient onto the conveyor in superposed relation, and continuously mixing the metered ingredients while conveying the same.

3. The process of claim 2 together with the steps of discharging the mixed ingredients into a spreader for discharge onto the ground surface, and mobilizing the ingredients, the conveyor and mixer, and the spreader.

4. The method of blending fertilizer providing the steps of supplying a quantity of each ingredient, independently discharging a metered quantity of each ingredient into a conveyor, positively conveying the metered ingredients in a common conveyor while accurately retaining the metered relation, and mixing the metered ingredients continuously while being conveyed from the point of metering to the point of discharge from the conveyor.

5. The method as defined in claim 4 together with the step of independently spreading the mixed and metered ingredients over a predetermined path having a progressively reducing thickness adjacent the edges, and overlapping the thinning edges of adjacent paths of spreading for providing a constant concentration of spreading over a relatively wide transverse space.

6. The method of mixing and spreading fertilizer comprising the steps providing a separate supply of each fertilizer ingredient, independently metering the ingredients from each separate supply, independently varying the metered rate from the separate supply, conveying and mixing the metered ingredients in a common positive displacement conveyor, and discharging the mixed metered ingredients in a transversely extending path.

References Cited in the file of this patent

UNITED STATES PATENTS

| | | |
|---|---|---|
| 1,810,463 | Cook | June 16, 1931 |
| 1,971,504 | Pratt | Aug. 28, 1934 |
| 2,079,061 | Zuckerman | May 4, 1937 |
| 2,393,849 | Werts | Jan. 29, 1946 |
| 2,719,030 | Pearson | Sept. 27, 1955 |

FOREIGN PATENTS

| | | |
|---|---|---|
| 41,351 | France | Oct. 11, 1932 |
| | (Addition to Pat. 729,495) | |